June 2, 1959 J. MARLOW 2,888,945

CAPACITY LEVEL CONTROL AND IMPROVED PROBE

Filed Dec. 21, 1955

INVENTOR.
Jacob Marlow.
BY
HIS ATTORNEY.

United States Patent Office 2,888,945

Patented June 2, 1959

2,888,945

CAPACITY LEVEL CONTROL AND IMPROVED PROBE

Jacob Marlow, Philadelphia, Pa., assignor to Robertshaw-Fulton Controls Company, Greensburg, Pa., a corporation of Delaware Application December 21, 1955, Serial No. 554,568

3 Claims. (Cl. 137—392)

This invention relates to capacity level control apparatus and more particularly to a capacity sensing probe adapted to distinguish between two media of different permittivities by producing a signal of electrical intelligence directly related to the difference in medium permittivity.

In devices of this general character, the probe usually comprises a bare or insulated electrode adapted to be mounted in one wall of the container to serve as one plate of a capacity sensing oscillator circuit. Generally the electrode is connected by a shielded cable to a separate oscillator unit housed in a casing located adjacent the container. In these devices, the physical location of the electrode is separated from the oscillator circuit, and as such, there are numerous disadvantages which seriously limit the extent of use of these level controllers or indicators. Most notable is the necessity of a shielded cable connecting the components and the problems associated with the use of coaxial R.F. cables and the relatively short distances between these components.

Other inherent disadvantages of the conventional capacity level control apparatus are the drifting characteristics due to the ambient temperature surrounding the coaxial cables. In addition, sensitivity is unnecessarily limited because of the standing capacity of the coaxial cable between the probe capacity and the oscillator circuit, consequently, small changes of the level of material cannot be detected, and there is no adequate application to materials having low dielectric constants.

It is an object of this invention to utilize a level probe including an oscillator circuit physically located adjacent thereto.

Another object of the invention is to eliminate the need of coaxial cables associated with level control apparatus thereby eliminating the disadvantages associated with cables.

Another object of the invention is to make the size of the probe unit small enough to be easily housed in a compact explosion resistant housing for hazardous areas and permit location and mounting of the power relay unit in a conventional enclosure out of the hazardous area.

Another object of the invention is to increase the sensitivity and extent of use of a capacity level control apparatus.

With these and other objects in view, the invention takes the form of an oscillator circuit arranged in a casing having a capacity probe supported thereon. The capacity probe is coupled to the oscillator circuit and is adapted to detect a capacity variance between the probe and the level of the material in a container for generating a current whose magnitude depends upon the capacitance variation. This change in current magnitude is sensed by means of a relay with a movable armature arranged in order to actuate electrical contacts for controlling the level of the material. The relay and the power supply for the oscillator circuit are located in a housing remote from the oscillator circuit housing and is connected thereto by conductors the lengths of which have no effect upon the sensitivity and accuracy of the oscillator circuit.

Other objects and advantages will become apparent from the following specification taken in conjunction with the accompanying drawing wherein.

Figure 1:
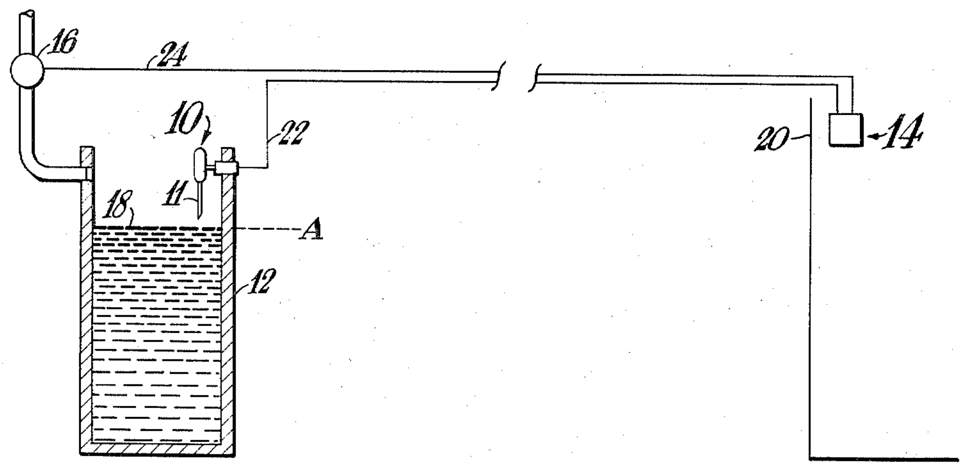
Fig. 1 is a schematic view showing an application of the present invention.

Referring now to Fig. 1, the system embodying this invention is shown as comprising an oscillator circuit housing 10 having a probe 11 secured thereto and being mounted on the inside of a container 12 for controlling the operation of a relay circuit disposed within a housing 14 and a pump 16 for controlling the supply of flowable material 18 to the container 12. The relay housing 14 may be located at a relatively long distance from the oscillator housing 10 and is shown as mounted upon any suitable structure 20 such as a wall of a building. A three-conductor cable 22 connects the oscillator circuit in the housing 10 to the relay circuit in the housing 14 and a two-conductor cable 24 connects the pump 16 to the relay circuit as will be discussed more fully hereinafter.

Figure 2:
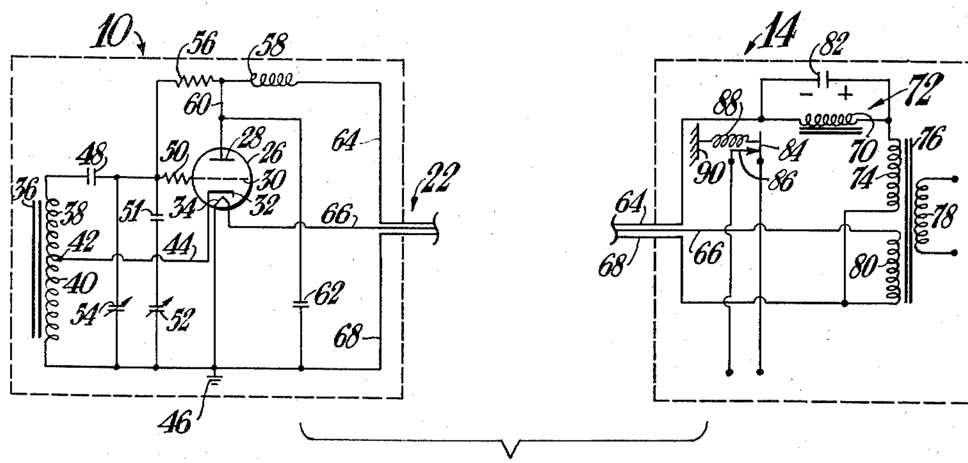
Fig. 2 is a diagrammatic illustration of a capacity level control apparatus embodying the essentials of the invention.

As shown in Fig. 2, the oscillator circuit comprises an electron discharge tube 26 having an anode 28, a grid 30, a cathode 32 and a cathode heater 34. Connected to the discharge tube 26 is an inductance coil 36 of the high permeability R.F. core type which is divided into two mutually coupled windings 38, 40 by a center tap 42 connected to the cathode 32 by a conductor 44. One end of the inductance coil 36 is connected to a ground 46 while the other side is connected through a capacitor 48 and a resistor 50 to the grid 30 of the tube 26. The resistor 50 serves to suppress undesired modes of oscillation and the common connection for the capacitor 48 and the resistor 50 is connected to the probe 11 through a blocking capacitor 51. For purposes of diagrammatic simplicity the probe 11 has been illustrated as a variable capacitor 52 having its other side connected to the ground 46.

A variable capacitor 54 is effectively connected in parallel with the capacitor 52 thus providing means for adjusting the range of capacitance experienced by the capacitor 52 for various materials having different permittivities. A resistor 56 is connected between the common connection of the capacitor 48 and the resistor 50 to the anode 28 to provide the leakage path for the grid 30 and an R.F. choke 58 connected to the anode circuit of the anode 28 and which will be more fully described hereinafter. The anode 28 is connected by a conductor 60 to the common terminal of the resistor 56 and the choke 58 and to ground 46 through a capacitor 62. The choke 58 and the capacitor 62 form a low pass filter through which power is supplied to the anode 28. Conductors 64, 66 and 68 are connected to the choke 58, the cathode heater 34 and the ground 46, respectively, and are grouped together to form the cable 22 which serves as a transmission line to the relay circuit housing 14.

The cable 22 may be of any suitable length and enters the housing 14 in any suitable manner. As shown in Fig. 2, the conductor 64 is connected to an excitor coil 70 of a relay 72 which in turn is connected in series with a secondary winding 74 of a power transformer 76 and serves to conduct current to the anode 28 of the tube 26 from the transformer 76. A primary 78 of the transformer 76 may be connected to any suitable source (not shown) of electric supply such as the ordinary 115 volt house current. The heater 34 for the cathode 32 is supplied with current through the conductor 66 from the secondary winding 80 which is magnetically coupled to the primary winding 78. The conductor 68 serves to connect the other end of the windings 74 and 80 to the ground 46 on the oscillator housing 10. A capacitor 82 is connected in parallel with the coil 74 for integrating the individual cycles of the rectified alternating current into a steadier flow of current, caused by the diode action of the cathode plate section of the tube 26.

The relay coil 70 is adapted to detect the magnitude of current in the anode circuit of the tube 26 and accordingly actuate a movable contact 84 of the relay 72. The movable contact 84 is adapted to engage a stationary contact 86 when the excitor coil 70 is deenergized at a predetermined magnitude of current in the anode circuit of the tube 26. A coil spring 88 connected between the movable contact 84 and a support 90 on the housing 14 serves to bias the movable contact 84 into engagement with the stationary contact 86 when the coil 70 is deenergized.

It will be apparent from the foregoing description that the connection of the windings 38, 40 of the inductance coil 36 with the capacitors 48, 51, 52 and 54 constitutes a parallel oscillator tank circuit, and these components being connected to the grid 30 and the cathode 32 comprise a bridge, the output of which is connected to the grid 30 and the cathode 32. By changing the capacity of the capacitor 52, which for purposes of circuit illustration is the capacity between the probe 11 and the container wall 12, sufficient regenerative feedback may be obtained to cause the system to oscillate. Thus, the change in the capacity of the probe 11 will result in a change in the amount of the positive feedback and hence control the amplitude of oscillation of the voltage appearing across the inductance coil 36.

During a bridge unbalance, or an unbalance where there is not adequate positive feedback voltage to start oscillation, a current will flow in the resistor 56 due to the diode action of the grid cathode section of the tube 26. This produces a positive voltage on the grid 30 so as to decrease the dynamic plate resistance of the tube 26 as compared to that when the same is zero biased and by a greater decrement than the dynamic transconductance of the tube 26 increases so that their product will result in a decreased quantity which is the amplification factor of the tube. If the capacity between the probe 11 and the wall 12 decreases, sufficient feedback is produced and oscillation of the tube will begin.

The build-up of the amplitude of oscillation will result in a voltage being developed across the resistor 56 of opposite polarity to that when the bridge is balanced thereby reducing the voltage in the latter. This effect, in turn, will increase the amplification factor of the tube 26 so that the amplitude of oscillation will increase rapidly to such an amount that a negative bias on the resistor 56 will be produced reducing the anode supply current in the conductor 64 to a minimum. The increase of the amplitude of oscillation will be limited because the increase in negative bias on the grid 30 will again reduce the amplification factor by virtue of the non-linearity of the function to such an amount where there will be reached a balance condition between the increasing total losses in the circuit, and a steady state of oscillation will be reached. Such a connection of the resistor 56 will permit stable separation of the oscillating and non-oscillating conditions by very narrow dead band and thus permitting small capacity differential detection.

On the other hand, if the capacitance between the probe 11 and the wall 12 is increased, feedback in the oscillator circuit will not be produced in sufficient amount to sustain oscillation and the anode current in the conductor 64 will reach a maximum.

While the values of the circuit elements shown in the drawing are not critical, the values listed in the following table of values for the various elements have been most satisfactory in the operation of the present invention:

| | |
|---|---|
| Resistance of resistor **50** | 560 ohms, .5 watt. |
| Resistance of resistor **56** | 1.5 megohms, .5 watt. |
| Capacity of capacitor **48** | 30 micromicrofarads. |
| Capacity of capacitor **51** | 500 micromicrofarads. |
| Capacity of capacitor **54** | 1–35 micromicrofarads. |
| Capacity of capacitor **62** | .01 microfarads. |
| Capacity of capacitor **82** | 8 microfarads |
| Inductance of choke **58** | 2.5 millihenries. |
| Inductance of coil **36** | 500 microhenries. |
| Output voltage of secondary winding **74** | 250 volts. |
| Output voltage of secondary winding **80** | 6.3 volts. |

In operation, assuming that the level of the fluid is below the level of the material 18 indicated at A, the capacitance developed in the probe 11 is sufficient to maintain enough regenerative feedback on the grid 30 to sustain oscillation in the tube 26. Therefore, minimum or near maximum current will flow in the anode circuit causing deenergization of the relay 72 and the closing of the contacts 84, 86 of the circuit to the pump 16. The material 18 will flow in the container 12 until the level of the material 18 reaches the level indicated at A where the value of the capacitance of the probe 11 is sufficient to cease the oscillation in the tube 26 and increase conduction thereof. With the tube 26 in this condition, the relay 72 will become energized to open the contacts 84, 86 for opening the circuit to the pump 16. As the material 18 recedes due to use thereof, the capacitance between the probe 11 and the level of the material will decrease again until sufficient regenerative feedback is generated on the grid 30 to permit the tube 26 to oscillate. Upon this occurrence, the current in the conductor 64 will reach a value to permit deenergization of the relay 72 and closing of the circuit to the pump 16 for actuating the same. In the event of failure of the tube 26, the line voltage or the relay 72, the relay will become deenergized for continuing the flow of material to the container 12. Therefore this circuit is low level fail safe.

The capacity relay circuit and the arrangement for the electrical components thereof wherein all the components in the oscillator circuit are mounted in the housing 10 to which the probe 11 is also attached and wherein the relay and power source are arranged in a separate housing, provides numerous advantages: the elimination of the usual R.F. coaxial cable which normally would be necessary to connect the probe 11 to the oscillator circuit, the reduction of the terminal capacity and the elimination of the temperature drift problems associated with the use of coaxial cables. Moreover, proper impedance termination of the coaxial cables will no longer be essential, resulting in extreme simplicity and reliability of the device.

It will be apparent to those skilled in the art that the illustrated embodiment of this invention may be variously changed and modified, or features thereof, singly or collectively, embodied in other combinations than that illustrated without departing from the scope of the invention and that accordingly the disclosure herein is illustrative only and the invention is not limited thereto.

I claim:

1. In an impedance sensitive device having a source of voltage, the combination comprising a self-contained oscillator circuit including a space discharge device having an anode, a cathode, and a grid operatively connected to an oscillatory tank circuit, means including a variable impedance element operatively associated with said tank circuit for varying said oscillator circuit between oscillating and non-oscillating conditions, means including a grid leak resistor interconnected between the anode and the grid of said discharge device to develop a bias on the grid thereof and enhance the sensitivity of said oscillator circuit whereby the oscillating and non-oscillating conditions thereof are separated by a narrow band, a remotely situated relay means responsive to the anode current of said discharge device, and means including three conductors operatively connecting said relay means and the source of voltage to said oscillator for delivering operating potential thereto.

2. In an impedance sensitive device having a source of voltage, the combination comprising a self-contained oscillator circuit including a space discharge device having an anode, a cathode, and a grid, said oscillator circuit also including an oscillatory tank circuit operatively connected to said device, means including a variable impedance element operatively associated with said tank circuits for varying said oscillator circuit between oscillating and non-oscillating conditions and thereby the conductivity of said tube, means including a grid leak resistor interconnected between the anode and the grid of said discharge device and adapted to produce a negative bias on the grid when said device is not conducting and to produce a positive bias on the grid when said device is conducting, remotely situated relay means responsive to the conductivity of said discharge device, and means including three conductors operatively connecting said relay means and the source of voltage to said oscillator circuit.

3. In a feedback control system for continuously maintaining a preset level of material within a container by actuating a valve means adapted to admit additional quantities of the material to the container, the combination comprising a self contained oscillator means including a space discharge device and a reactance element variable in response to the level of the material and adapted to initiate and terminate oscillation within said oscillator means, said oscillator means further including a grid leak resistor element interconnected between the anode and control grid of said discharge device to develop a bias and enhance the sensitivity of said oscillator means to variations of said reactance element, a remotely situated relay circuit including means for deriving a unidirectional voltage therein, first conductor means including three conductors interconnected between said relay circuit and said oscillator means to receive the unidirectional voltage therefrom and convey an operating potential thereto, and second conductor means interconnected between said relay circuit and the valve means for effecting the admission of the material responsive to the unidirectional voltage.

References Cited in the file of this patent

UNITED STATES PATENTS

| | | |
|---|---|---|
| 2,477,511 | Comb | July 26, 1949 |
| 2,529,796 | Cade | Nov. 14, 1950 |
| 2,600,928 | Semm | June 17, 1952 |
| 2,627,539 | Tompkins | Feb. 3, 1953 |
| 2,657,579 | Milsom | Nov. 3, 1953 |
| 2,721,267 | Collins | Oct. 18, 1955 |
| 2,801,339 | Hubbard | July 30, 1957 |

FOREIGN PATENTS

| | | |
|---|---|---|
| 723,653 | Great Britain | Feb. 9, 1955 |